(12) United States Patent
Hovgaard

(10) Patent No.: US 9,618,629 B2
(45) Date of Patent: Apr. 11, 2017

(54) APPARATUS AND METHOD FOR MONITORING PERFORMANCE OF RADIATION DETECTOR

(71) Applicant: Jens Hovgaard, Mississauga (CA)

(72) Inventor: Jens Hovgaard, Mississauga (CA)

( * ) Notice: Subject to any disclaimer, the term of this patent is extended or adjusted under 35 U.S.C. 154(b) by 0 days.

(21) Appl. No.: 14/544,102

(22) Filed: Nov. 25, 2014

(65) Prior Publication Data
US 2016/0146948 A1     May 26, 2016

(51) Int. Cl.
| | | |
|---|---|---|
| *G01T 1/20* | (2006.01) | |
| *G01T 1/17* | (2006.01) | |
| *G01T 7/00* | (2006.01) | |
| *G01T 1/40* | (2006.01) | |

(52) U.S. Cl.
CPC .............. *G01T 1/17* (2013.01); *G01T 1/2018* (2013.01); *G01T 1/40* (2013.01); *G01T 7/005* (2013.01)

(58) Field of Classification Search
CPC ......... G01T 1/2018; G01T 1/247; G01T 3/06; G01T 1/17; G01T 7/005; G01T 1/203; G01T 1/248
USPC ....................................................... 250/362
See application file for complete search history.

(56) References Cited

U.S. PATENT DOCUMENTS

| | | |
|---|---|---|
| 2,648,015 A | 5/1951 | Greenfield et al. |
| 2,839,688 A | 12/1955 | Anton |
| 4,405,234 A | 9/1983 | Juaire |
| 4,826,316 A | 5/1989 | Odum |
| 5,036,200 A * | 7/1991 | Dubail ................ G01T 1/40 250/356.2 |
| 5,440,135 A | 8/1995 | Shonka |

(Continued)

FOREIGN PATENT DOCUMENTS

WO    WO2006/095188 A1    9/2006

OTHER PUBLICATIONS

Health Physics, Radiation Portal Monitor—Model 4525-21000, Introduction, 2009-2014 Ludium Measurements, Inc., 2 pages.

(Continued)

*Primary Examiner* — Kiho Kim
(74) *Attorney, Agent, or Firm* — Fitch, Even, Tabin & Flannery LLP

(57) ABSTRACT

An apparatus is for a detector assembly configured to receive a signal from a scintillation detector. The apparatus includes a controller assembly including a controller analysis section. The controller analysis section includes a microprocessor assembly, and a memory assembly operatively coupled to the microprocessor assembly, the memory assembly tangibly storing microprocessor-executable code. The microprocessor-executable code to be read by the microprocessor assembly. The microprocessor-executable code is configured to urge the microprocessor assembly to execute an operation for: (A) establishing an energy calibration using features in a spectrum associated with known gamma radiation from radioactive decay or other nuclear processes; and (B) adjusting a gain to be applied by the detector assembly based on the known energy features and thus maintain the energy calibration. With a known energy calibration, the equivalent energy of the single photoelectron peak is inversely related to the light collection efficiency and the detector sensitivity.

20 Claims, 10 Drawing Sheets

(56) References Cited

U.S. PATENT DOCUMENTS

| | | | |
|---|---|---|---|
| 5,677,536 A * | 10/1997 | Vickers | G01T 1/1642 250/252.1 |
| 6,087,656 A | 7/2000 | Kimmich et al. | |
| 6,114,703 A | 9/2000 | Levin et al. | |
| 6,342,698 B1 | 1/2002 | Stark | |
| 7,183,554 B2 | 2/2007 | Gallagher et al. | |
| 7,233,781 B2 | 6/2007 | Hunter et al. | |
| 7,429,736 B2 | 9/2008 | Antanouski | |
| 7,638,760 B1 | 12/2009 | Heipp et al. | |
| 7,843,356 B2 | 11/2010 | Webb | |
| 8,426,827 B2 | 4/2013 | Cahill | |
| 8,513,610 B2 | 8/2013 | Lentering et al. | |
| 2003/0178575 A1 | 9/2003 | Mallette | |
| 2004/0036026 A1* | 2/2004 | Engdahl | G01T 1/1642 250/363.09 |
| 2004/0212499 A1 | 10/2004 | Bohine, Jr. | |
| 2004/0262524 A1* | 12/2004 | Osucha | G01N 23/12 250/358.1 |
| 2005/0029460 A1 | 2/2005 | Iwatschenko-Borho et al. | |
| 2006/0065824 A1* | 3/2006 | Mickael | E21B 47/0005 250/252.1 |
| 2007/0051892 A1* | 3/2007 | Warburton | G01T 1/172 250/362 |
| 2007/0194222 A1* | 8/2007 | Takayama | G01T 1/1663 250/252.1 |
| 2007/0284518 A1* | 12/2007 | Randall | G01T 7/005 250/261 |
| 2008/0083870 A1* | 4/2008 | Malmin | G01T 1/40 250/252.1 |
| 2008/0251709 A1* | 10/2008 | Cooke | G01T 1/1644 250/252.1 |
| 2010/0065723 A1* | 3/2010 | Burbar | G01T 1/1648 250/214 AG |
| 2010/0128852 A1* | 5/2010 | Yamamoto | G01T 1/00 378/207 |
| 2011/0029246 A1* | 2/2011 | Nikitin | G01V 5/04 702/8 |
| 2011/0031405 A1* | 2/2011 | Kulik | G01T 1/40 250/362 |
| 2011/0035161 A1* | 2/2011 | McFadden | G01T 1/203 702/28 |
| 2011/0186721 A1* | 8/2011 | Galford | G01V 5/101 250/252.1 |
| 2011/0205361 A1* | 8/2011 | Guillot | G01V 5/0083 348/143 |
| 2011/0211675 A1* | 9/2011 | Ramsden | G01T 1/40 378/82 |
| 2013/0134304 A1* | 5/2013 | Beekman | G01T 1/40 250/269.6 |
| 2013/0313419 A1 | 11/2013 | Nakazawa et al. | |
| 2013/0327932 A1* | 12/2013 | Kim | G01T 1/208 250/252.1 |
| 2014/0145072 A1* | 5/2014 | Adolph | G01T 1/40 250/261 |
| 2014/0197321 A1* | 7/2014 | Bendahan | G01T 1/20 250/366 |
| 2015/0001383 A1* | 1/2015 | Inanc | G01T 7/005 250/252.1 |
| 2015/0212218 A1* | 7/2015 | Manslow | G01T 1/362 378/207 |
| 2015/0316665 A1* | 11/2015 | Ramsden | G01T 1/40 378/207 |

OTHER PUBLICATIONS

Health Physics, Radiation Portal Monitor—Model 4525-Series, Introduction, 2009-2014 Ludium Measurements, Inc., 4 pages.
RCTEM, Rotem Industries Ltd., Radiological Emergency Response Solutions, Rotem Industries Ltd. 2007, 2 pages.
Canberra, Measurement Solutions for Nuclear Safety, Security and the Enviornment, Field Services, Canberra Industries Inc. 2014, 1 page.
Canberra, EcoGama-g, Environmental Gamma Radiation Monitor, Canberra Industries, Inc., 2012, 6 pages.
RCTEM, AMP-50 Area Monitor, Rotem Industries Ltd. 2007, 2 pages.
Canberra, Model S573 ISOCS Calibration Software, Canberra Industries Inc. 2013, 12 pages.
RCTEM, DRM-2 Data Radiation Monitor, Wide-range GM detector instrument, Rotem Model # BAK-1090, Rotem Industries, 2 pages.
RCTEM, DRM-2 Data Radiation Monitor, Wide-range GM detector instrument, Rotem Model # BAK-1090, Rotem Industries, 2 pages, believed to have existed since 2008.
R. L. Grasty et al., "The analysis of multichannel airborne gamma-ray spectra", Geophysics, vol. 50, No. 12, p. 2611-2620, Dec. 1985.
Ludlum Measurements, Inc., Model 4525 Series Radiation Portal Monitors, Oct. 2013, 3 pages.

* cited by examiner

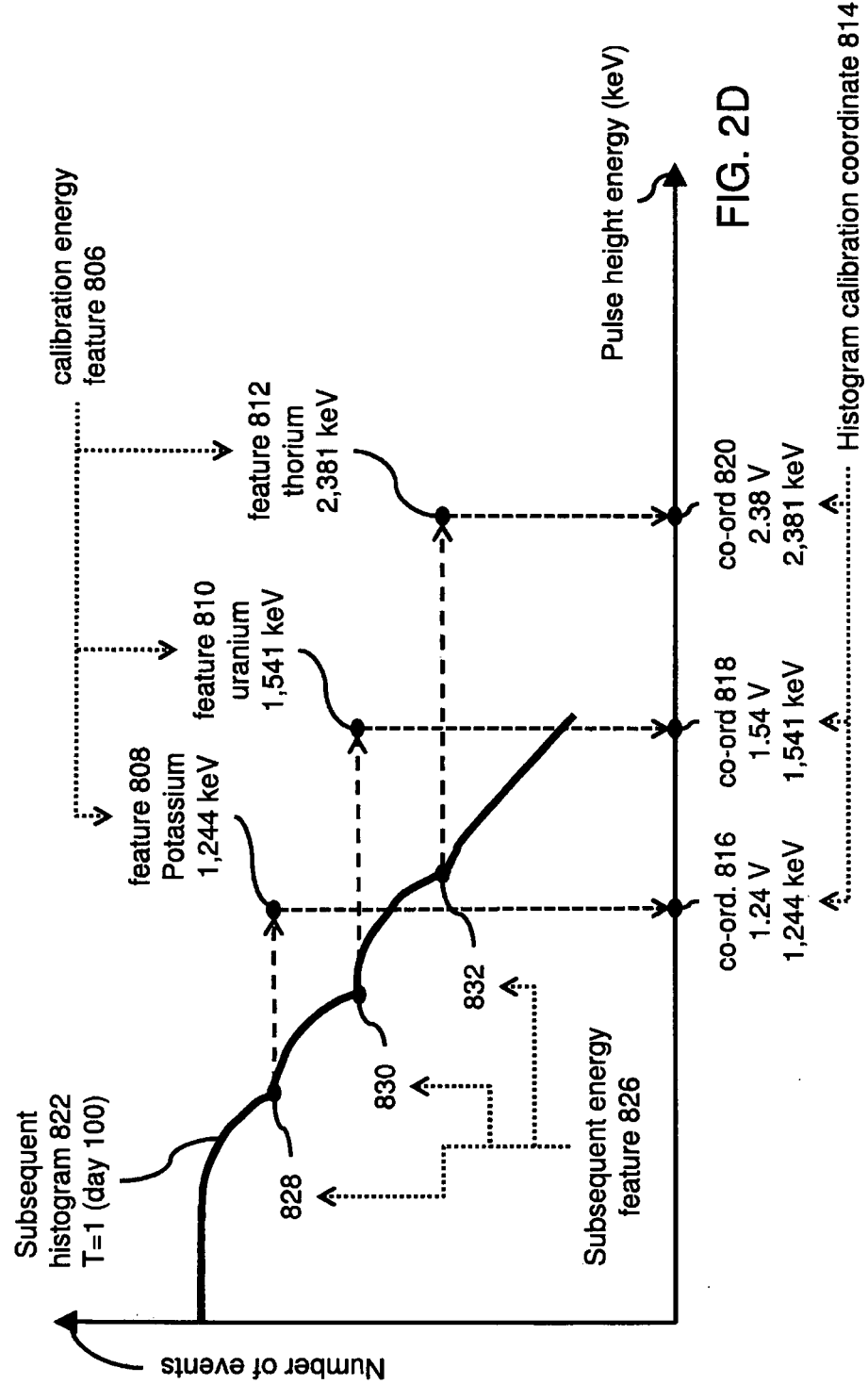

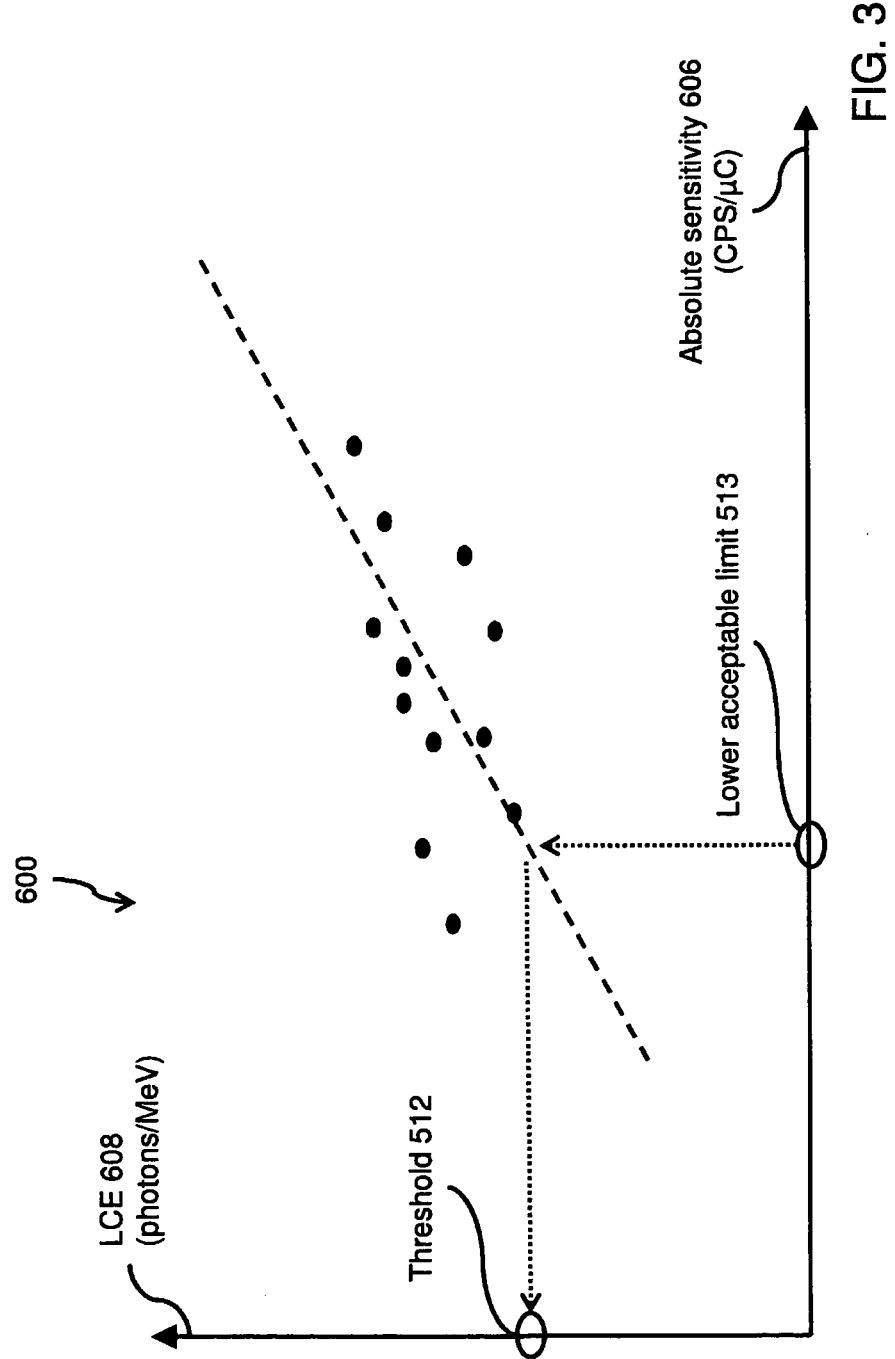

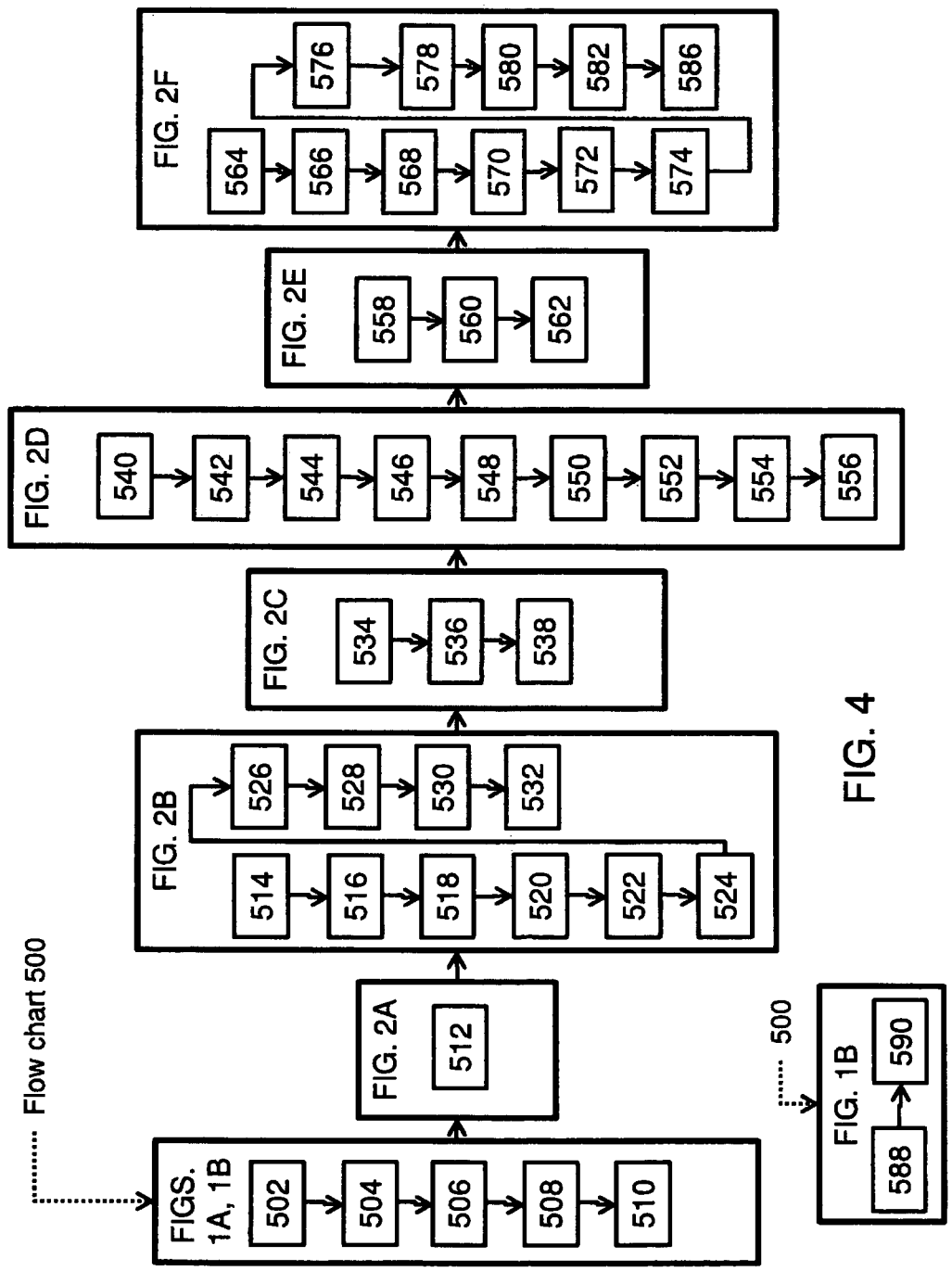

US 9,618,629 B2

APPARATUS AND METHOD FOR MONITORING PERFORMANCE OF RADIATION DETECTOR

TECHNICAL FIELD

Some aspects generally relate to (and are not limited to) an apparatus and a method for monitoring the performance degradation of a radiation detector.

SUMMARY

A radionuclide or radioactive nuclide, also referred to as a radioisotope or radioactive isotope, is an atom with an unstable nucleus, characterized by excess energy available to be imparted either to a newly created radiation particle within the nucleus or via internal conversion. During this process, the radionuclide is said to undergo radioactive decay, resulting in the emission of gamma ray(s) and/or subatomic particles such as alpha or beta particles. These emissions constitute ionizing radiation. Radionuclides occur naturally or may be produced artificially. There are about 650 radionuclides with half-lives longer than about 60 minutes (see list of nuclides). Of these, 34 are primordial radionuclides that existed before the creation of the solar system, and there are another 50 radionuclides detectable in nature as daughters of these or produced naturally on Earth by cosmic radiation. There are a much larger number of radionuclides, more than 2400, with decay half-lives shorter than 60 minutes. Most of these are only produced artificially, and have very short half-lives. For comparison, there are about 254 stable nuclides. All chemical elements have radionuclides. Even the lightest element, hydrogen, has a well-known radionuclide, tritium. The heaviest elements (heavier than lead) exist only as radionuclides. Radionuclides with suitable half-lives play an important part in a number of technologies, for example, nuclear medicine, and ionization smoke detectors. Radionuclides can also present both real and perceived dangers to health.

Radiation is present everywhere from natural occurring radioactive material that includes Potassium, and the decay series of Uranium and Thorium. High energetic cosmic radiation will induce secondary gamma radiation from atomic interaction.

Radiation detectors are configured to detect the presence of radiation or quantifying the radiation for example as a radiation dose.

SUMMARY

It will be appreciated that there exists a need to mitigate (at least in part) at least one problem associated with existing radiation detectors. After much study of the known systems and methods with experimentation, an understanding of the problem and its solution has been identified and is articulated as follows:

Over time, the performance of radiation detectors degrades. Currently, the performance degradation of radiation detectors is monitored at predetermined periods of time (such as on an annual basis) by highly trained personnel that visit the radiation detectors in the field (in situ) with sophisticated calibration equipment. Sometimes, the radiation detectors have degraded to below-acceptable performance before the radiation detectors have been performance-tested and calibrated (this is an unacceptable condition).

What is needed is a way to monitor the performance degradation of the radiation detectors without having to send (deploy) trained personnel with sophisticated calibration sources to the field (in situ). The performance degradation of the radiation detector should be more closely monitored on a relatively frequent basis by using less sophisticated resources (without having to deploy or use trained personnel and complicated calibration equipment to make the determination of performance degradation).

To mitigate, at least in part, at least one problem associated with the existing performance monitoring of radiation detectors, there is provided (in accordance with a major aspect) an apparatus. The apparatus 10 is for a detector assembly configured to receive a signal from a scintillation detector in response to the scintillation detector receiving radiation energy. The apparatus includes a controller assembly including a controller analysis section. The controller analysis section includes a microprocessor assembly, and a memory assembly. The memory assembly is operatively coupled to the microprocessor assembly, the memory assembly tangibly storing microprocessor-executable code. The microprocessor-executable code configured to be read by the microprocessor assembly. The microprocessor-executable code is configured to urge the microprocessor assembly to execute an operation for: (A) establishing an energy calibration using features in a spectrum associated with known gamma radiation from radioactive decay or other nuclear processes; and (B) adjusting a gain to be applied by the detector assembly based on the known energy features and thus maintain the energy calibration. With a known energy calibration, the equivalent energy of the single photoelectron peak is inversely related to the light collection efficiency and the detector sensitivity.

To mitigate, at least in part, at least one problem associated with the existing performance monitoring of radiation detectors, there is provided (in accordance with a major aspect) a method. The method is for a detector assembly configured to receive a signal from a scintillation detector in response to the scintillation detector receiving radiation energy. The method includes: (A) establishing an energy calibration using features in a spectrum associated with known gamma radiation energy from radioactive decay or other nuclear processes; and (B) adjusting a gain to be applied to the detector assembly based on the known energy features and thus maintain the energy calibration. With a known energy calibration, the equivalent energy of the single photoelectron peak is inversely related to the light collection efficiency and the detector sensitivity.

To mitigate, at least in part, at least one problem associated with the existing performance monitoring of radiation detectors, there is provided (in accordance with a major aspect) an apparatus. The apparatus is for a detector assembly being configured to receive a signal from a scintillation detector in response to the scintillation detector receiving radiation energy, and the apparatus is for a controller assembly including a microprocessor assembly. The apparatus includes a memory assembly configured for use with the controller assembly including a microprocessor assembly. The memory assembly is configured to operatively couple to the microprocessor assembly. The memory assembly tangibly stores microprocessor-executable code. The microprocessor-executable code is configured to be read by the microprocessor assembly. The microprocessor-executable code is configured to urge the microprocessor assembly to execute an operation for: (A) establishing an energy calibration using features in a spectrum associated with known gamma radiation from radioactive decay or other nuclear processes; and (B) adjusting a gain to be applied to the detector assembly based on the known energy features and thus maintain the energy calibration. With a known energy calibration, the equivalent energy of the single photoelectron peak is inversely related to the light collection efficiency and the detector sensitivity.

Other aspects are identified in the claims.

Other aspects and features of the non-limiting embodiments may now become apparent to those skilled in the art upon review of the following detailed description of the non-limiting embodiments with the accompanying drawings.

BRIEF DESCRIPTION OF THE DRAWINGS

The non-limiting embodiments may be more fully appreciated by reference to the following detailed description of the non-limiting embodiments when taken in conjunction with the accompanying drawings, in which:

FIG. 2D (SHEET 6 of 10 SHEETS) depicts a schematic representation of an embodiment of a subsequent histogram to be captured by the controller assembly of FIG. 1A;

FIG. 3 (SHEET 9 of 10 SHEETS) depicts a schematic view (representation) of the relationship between absolute detector efficiency and light collection efficiency of the detector assembly of FIG. 1A; and FIG. 4 (SHEET 10 of 10 SHEETS) depicts a schematic representation of an embodiment of a flow chart depicting operations of the controller assembly depicted in FIG. 1A.

Figure 1A:
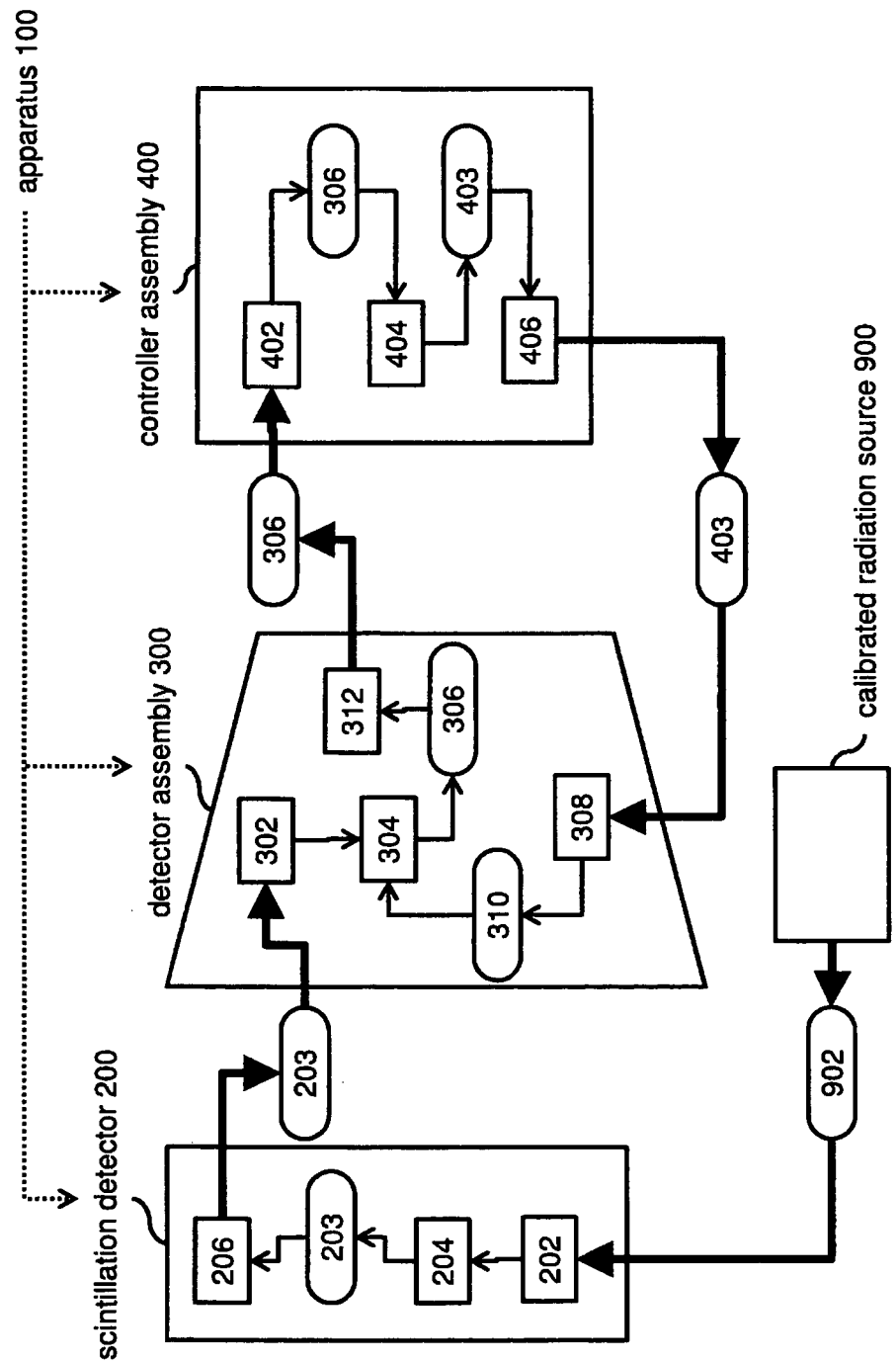
FIGS. 1A and 1B (SHEETS 1 and 2 of 10 SHEETS) depict schematic views of embodiments of an apparatus having a controller assembly, for use with a and a detector assembly.

The drawings are not necessarily to scale and may be illustrated by phantom lines, diagrammatic representations and fragmentary views. In certain instances, details unnecessary for an understanding of the embodiments (and/or details that render other details difficult to perceive) may have been omitted.

Corresponding reference characters indicate corresponding components throughout the several figures of the Drawings. Elements in the several figures are illustrated for simplicity and clarity and have not been drawn to scale. The dimensions of some of the elements in the figures may be emphasized relative to other elements for facilitating an understanding of the various disclosed embodiments. In addition, common, but well-understood, elements that are useful or necessary in commercially feasible embodiments are often not depicted to provide a less obstructed view of the embodiments of the present disclosure.

LISTING OF REFERENCE NUMERALS USED IN THE DRAWINGS 100 apparatus
200 scintillation detector
202 scintillator input section
203 scintillator output signal
204 scintillator conversion section
206 scintillator output section
300 detector assembly
302 detector input section
304 detector conversion section
306 detector output signal
308 detector adjustment section
310 gain factor
312 detector output section
324 calibrated single-photoelectron energy quantity
400 controller assembly
402 controller input section
403 gain adjustment signal
404 controller analysis section
406 controller output section
408 microprocessor assembly
410 memory assembly
411 display screen
412 microprocessor-executable code
413 user input device
500 flow chart
502 to 590 operation
600 graph
606 horizontal axis
608 vertical axis
700 graph
702 x-axis
704 y-axis
706 detector output signal
804 energy calibrated histogram
806 calibration energy feature
808 potassium energy calibration feature
810 uranium energy calibration feature
812 thorium energy calibration feature
814 histogram calibration coordinate
816 calibration potassium histogram coordinate
818 calibration uranium histogram coordinate
820 calibration thorium histogram coordinate
822 subsequent histogram
823 gain-adjusted/energy calibrated subsequent histogram
826 subsequent energy calibration feature
828 subsequent potassium energy feature
830 subsequent uranium energy feature
832 subsequent thorium energy feature
834 energy calibrated single-photoelectron energy peak
836 energy calibrated single-photoelectron histogram coordinate
840 subsequent single-photoelectron energy peak
842 histogram coordinate
844 subsequent histogram
846 subsequent single-photoelectron energy peak
848 histogram coordinate
512 threshold level 900 source of radiation (this can be, but is not limited to, natural background radiation and cosmic induced gamma radiation, etc.).

902 radiation energy

DETAILED DESCRIPTION OF THE NON-LIMITING EMBODIMENT(S)

The following detailed description is merely exemplary and is not intended to limit the described embodiments or the application and uses of the described embodiments. As used, the word "exemplary' or Illustrative" means "serving as an example, instance, or illustration." Any implementation described as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure. The scope of the invention is defined by the claims. For the description, the terms "upper," "lower," "left," "rear," "right," "front," "vertical," "horizontal," and derivatives thereof shall relate to the examples as oriented in the drawings. There is no intention to be bound by any expressed or implied theory in the preceding Technical Field, Background, Summary or the following detailed description. It is also to be understood that the devices and processes illustrated in the attached drawings, and described in the following specification, are exemplary embodiments (examples), aspects and/or concepts defined in the appended claims. Hence, dimensions and other physical characteristics relating to the embodiments disclosed are not to be considered as limiting, unless the claims expressly state otherwise. It is understood that the phrase "at least one" is equivalent to "a". The aspects (examples, alterations, modifications, options, variations, embodiments and any equivalent thereof) are described regarding the drawings. It should be understood that the invention is limited to the subject matter provided by the claims, and that the invention is not limited to the particular aspects depicted and described.

Figure 1B:
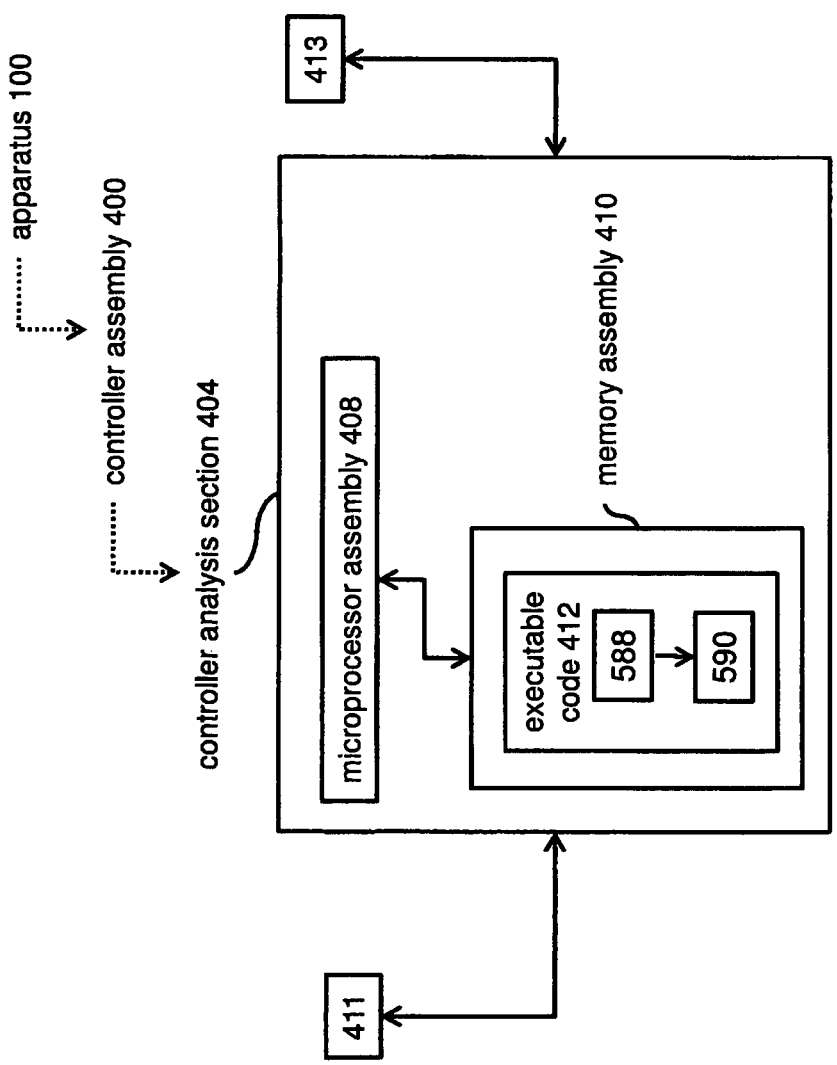

FIGS. 1A and 1B depict schematic views of embodiments of an apparatus 100 having a controller assembly 400 for use with a detector assembly 300.

In accordance with an embodiment, the apparatus 100 includes (and is not limited to) a combination of a scintillation detector 200, a detector assembly 300 and a controller assembly 400.

The scintillation detector 200 may also be called a scintillation detector, a scintillator assembly, or a scintillator, etc. The purpose of the scintillation detector 200 is to detect radiation (such as, ionizing radiation, etc.). The scintillation detector 200 is configured to detect radiation. The scintillation detector 200 includes (and is not limited to) a scintillator input section 202, a scintillator conversion section 204, and a scintillator output section 206. The scintillator input section 202 is configured to input (receive) the radiation energy 902 (such as, gamma radiation). The scintillator conversion section 204 is configured to convert the radiation energy 902 provided by the scintillator input section 202 into a scintillator output signal 203 (such as, light energy or light). The scintillator output section 206 is configured to output (transmit) the scintillator output signal 203 provided by the scintillator conversion section 204. An example of the scintillation detector 200 includes (and is not limited to) a Polyvinyltoluene scintillator, which is also called a PVT scintillator. Polyvinyltoluene can be doped with anthracene to produce a plastic-based scintillator. When subjected to ionizing radiation (both particle radiation and gamma radiation), the amount of visible radiation (light) emitted by the Polyvinyltoluene scintillator is approximately proportional to the absorbed dose of radiation. It will be appreciated that, over the passage of time, the operation (performance, efficiency) of the scintillation detector 200 degrades, at least in part, due to temperature conditions, other factors, etc. The degradation phenomena occur for reasons that are not within the scope of this description, and will therefore not be described with any details.

The scintillation detector 200 is configured to receive gamma radiation energy from a radiation source (for example from vehicles passing by the scintillation detector 200). In addition, the scintillation detector 200 is also configured to convert the gamma radiation energy that was received from the radiation source into light. Specifically, the scintillation detector 200 is to be positioned in the field for example monitoring traffic and vehicles at the border. The scintillation detector 200 and the detector assembly 300 are configured to detect radiation emitting from the vehicles, and to provide a scintillator output spectra showing radiation spectra for the vehicles moving past the scintillation detector 200.

The detector assembly 300 includes (and is not limited to) a detector input section 302, a detector conversion section 304, a detector adjustment section 308 and a detector output section 312. The detector input section 302 is configured to input (receive) the scintillator output signal 203 provided by the scintillator output section 206. The detector conversion section 304 is configured to convert the scintillator output signal 203 received by the detector input section 302 into a detector output signal 306 (such as, an electronic pulse signal, scintillator spectra output data). The detector adjustment section 308 is configured to controllably adjust the detector conversion section 304 in such a way that an aspect of the detector output signal 306 is changed. The detector adjustment section 308 provides a gain factor 310 to be applied to the detector conversion section 304 in such a way as to change an aspect of the detector output signal 306 provided by the detector conversion section 304 to the detector output section 312. The detector output section 312 is configured to output the detector output signal 306 provided by the detector conversion section 304.

The detector assembly 300 may also be called a light detector, a light sensing device, a light-collecting device, etc. An example of the detector assembly 300 includes (and is not limited to) a photomultiplier tube. The photomultiplier tube (photomultiplier or PMT) is a vacuum tube, and more specifically is a vacuum phototube configured to be a sensitive detector of light in the ultraviolet, visible, and near-infrared ranges of the electromagnetic spectrum. For instance, the photomultiplier tube is configured to multiply the current produced by incident light by as much as 100 million times (i.e., 160 dB), in multiple dynode stages, enabling (for example) individual photons to be detected when the incident flux of light is relatively very low. It will be appreciated that, over the passage of time, the operation (performance, efficiency) of the detector assembly 300 degrades, at least in part, due to temperature conditions, other factors, etc. The degradation phenomena occur for reasons that are not within the scope of this description, and will therefore not be described with any details.

The detector assembly 300 is configured to be spatially positioned proximate to (relative to) the scintillation detector 200 in such a way that the detector assembly 300 receives light from the scintillation detector 200. The detector output section 312 of the detector assembly 300 is configured to output the detector output signal 306 (such as, an electronic pulse signal). The detector output signal 306 has a pulse height that is proportional to the radiation energy deposited in (received by) the scintillation detector 200. The detector assembly 300 is configured to generate and output the detector output signal 306 (also called a scintillator output radiation spectra) based on the light received from the scintillation detector 200.

In general terms, the controller assembly 400 is configured to monitor performance (degradation monitoring) of the detector assembly 300. The controller assembly 400 includes (and is not limited to) a controller input section 402, a controller analysis section 404, and a controller output section 406. The controller assembly 400 may also be called an analyzer. Examples of the controller assembly 400 may include an embedded computer, desktop computer, a laptop computer, a handheld computer, and any equivalent thereof.

The controller input section 402 is configured to input (receive) the detector output signal 306 provided by the detector output section 312. The controller analysis section 404 is configured to execute a computing operation, such as computing a gain adjustment signal 403 based on an analysis of the detector output signal 306 provided by the controller input section 402. The controller analysis section 404 is configured to execute a computing operation, such as analyzing the detector output signal 306 provided by the controller input section 402. The gain adjustment signal 403 (also called, a gain factor, a gain adjustment and control signal, etc.) is configured to adjust the operation of the detector adjustment section 308. This is done in such a way that the operation of the detector conversion section 304 controllably adjusts the aspect of the detector output signal 306 provided by the detector conversion section 304 to the detector output section 312. The controller output section 406 is configured to output (provide) the gain adjustment signal 403 provided by the controller analysis section 404 to the detector adjustment section 308.

FIG. 4 depicts a schematic representation of an embodiment of a flow chart 500 showing the operations of the controller assembly 400 described in association with the descriptions of FIGS. 1A, 1B, and 2A to 2F and FIG. 3.

It will be appreciated that operations of the controller assembly 400 is described in connection with the description associated with FIGS. 1A, 1B, and 2A to 2F and FIG. 3. Operations of the controller assembly 400 depicted in FIG. 4 are referenced by the series 500 numbers.

Referring to FIG. 1B, the controller analysis section 404 of the controller assembly 400 (depicted in FIG. 1A) includes a microprocessor assembly 408 and a memory assembly 410 operatively coupled to the microprocessor assembly 408. The memory assembly 410 tangibly stores the microprocessor-executable code 412. The microprocessor-executable code 412 is configured to be read by the microprocessor assembly 408. This is done in such a way that the microprocessor assembly 408 executes predetermined operations (instructions provided by the microprocessor-executable code 412 and to be executed by the microprocessor assembly 408), such as a monitoring operation, etc. For instance, the analyzing operation (to be executed by the microprocessor assembly 408) is configured to urge the microprocessor assembly 408 to analyze the detector output signal 306 provided by the detector output section 312 of the detector assembly 300 (depicted in FIG. 1A) in accordance with specific or predetermined instructions and/or criteria, etc.

Referring to the embodiment of FIG. 1A, the controller assembly 400 is operatively connected to the detector assembly 300. Specifically, the detector assembly 300 includes the detector output section 312 configured to be operatively connected to a controller input section 402 of the controller assembly 400. This is done in such a way that the detector output signal 306 is transmitted from the detector assembly 300 to the controller assembly 400. The controller assembly 400 is configured execute an operation 502 for receiving the detector output signal 306 (the scintillator output radiation spectra) from the detector assembly 300 (the detector output signal 306 was generated by the detector assembly 300). The controller assembly 400 is configured to execute an operation 504 for analyzing the detector output signal 306 that was received from the detector assembly 300. The controller assembly 400 is configured to execute an operation 506 for determining the amount of adjustment needed to be applied to the detector assembly 300 in order to recalibrate (adjust) an aspect of the detector output signal 306 (the scintillator output) to be provided by the detector assembly 300 (calibrate to known reference points such as Potassium, Uranium, Thorium). The controller assembly 400 is configured to execute an operation 508 for providing the gain adjustment signal 403 to the detector assembly 300. The controller assembly 400 is configured to execute an operation 510 for iterative computing and determining the gain adjustments that may be required over time and to be provided to the detector assembly 300 (to be provided on a continuous basis or an intermediate basis, as desired or required).

Figure 2A:
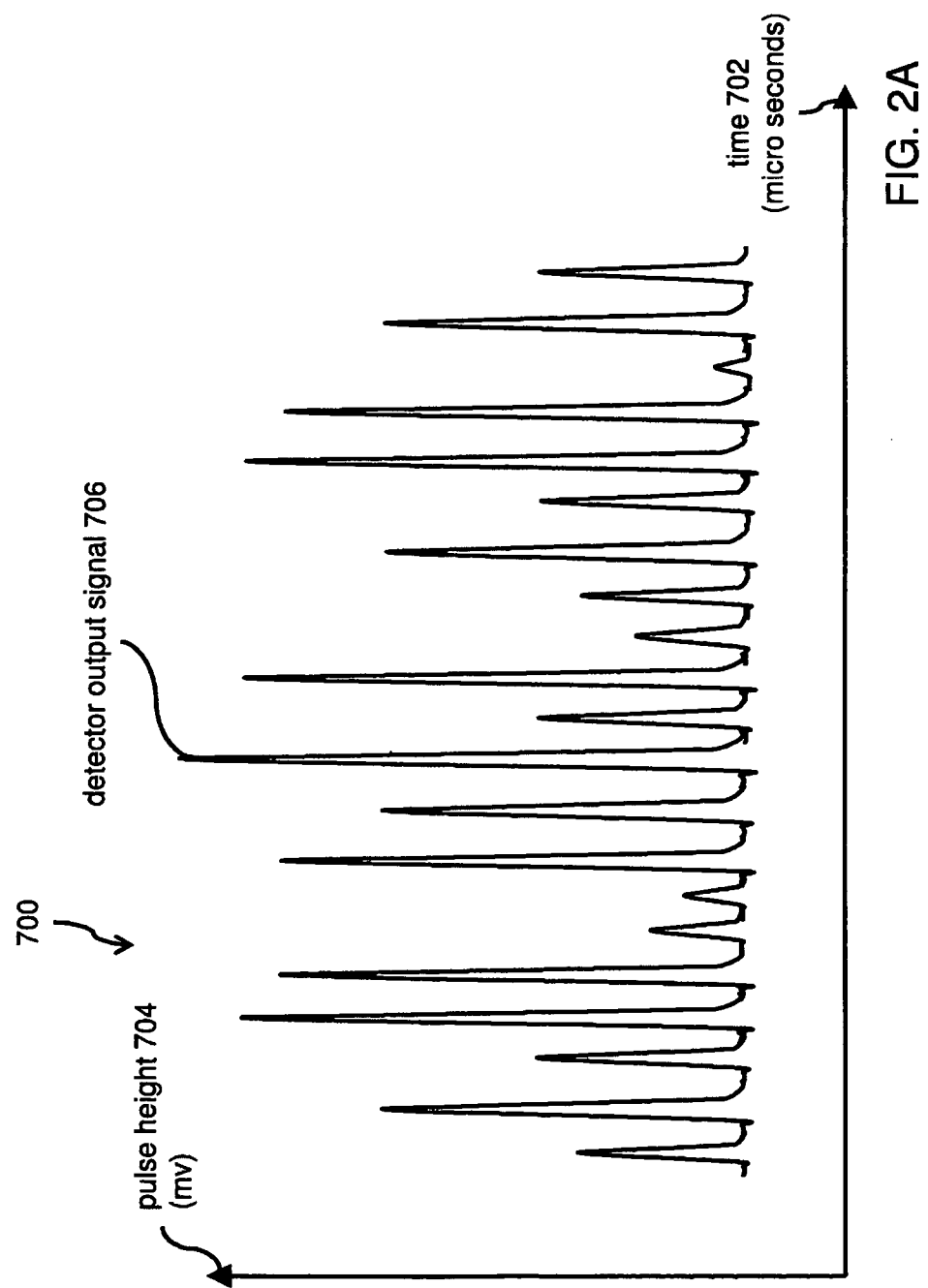
FIG. 2A (SHEET 3 of 10 SHEETS) depicts an embodiment of a detector output signal to be provided by the detector assembly depicted in FIG. 1A.

FIG. 2A depicts an embodiment of a detector output signal 706 to be provided by the detector assembly 300 depicted in FIG. 1A.

The detector output signal 706 is depicted in a graph 700. The graph 700 has an x-axis 702 and a y-axis 704. The x-axis 702 represents lapsed time, measured in (for example) microseconds. The y-axis 704 represents the pulse height of the detector output signal 706, measured in (for example) millivolts (mV). The detector output signal 706 is to be provided by the detector output section 312 of the detector assembly 300 depicted in FIG. 1A (under a calibration condition). The pulse height of the detector output signal 706 is proportional to (or indicates the degree of) radiation dose deposited in (or received by) the scintillation detector 200 depicted in FIG. 1A.

For the case where the factory calibration is to be established (that is, for time t=0) for the detector assembly 300, the controller assembly 400 is configured to execute an operation 512 for receiving (over a predetermined period of time, such as about 5 minutes, etc.) the detector output signal 706 from the detector output section 312 of the detector assembly 300. The factory calibration (calibration condition) is the case where the detector is exposed to a known radiation source either from normal background radiation or from any radioactive substance that emits gamma rays of known and appropriate energy or energies. The energy calibrated histogram 804 is computed based on the information contained in the detector output signal 706 depicted in FIG. 2A. The source of radiation 900 emits a predetermined quantity of gamma radiation energy, in which the units of measurement for radioactive energy is indicated (for example) in kiloelectron volts or keV (and any equivalent thereof). For instance, when potassium ($^{40}$K) decays, it emits a characteristic 1,461 kiloelectron volt (keV) gamma ray. For instance, when uranium decays through $^{214}$Bi, it emits a characteristic 1,764 keV gamma ray. For instance, when Thorium decays through $^{208}$Tl, it emits a characteristic gamma ray of 2,614 keV. It will be appreciated that radioactivity from source of radiation 900 is the cause of pulses that appear in the detector output signal 706. It will be appreciated that the energy of the radiation emitted from the source of radiation 900 is a specific energy associated with a specific for radionuclide (for example a natural occurring radionuclide).

In accordance with an embodiment, the x-axis (pulse height) is segmented into bins aligned along the X-axis. The binning of the x-axis is done as follows: bin number 0 contains the number of pulses (in the detector output signal 706) having a pulse height that exists between for example zero (0) mV to ten (1) mV; bin number 1 contains the number of pulses (in the detector output signal 706) having a pulse height that exists between 1 mV to 2 mV; bin number 2 contains the number of pulses (in the detector output signal 706) having a pulse height between 2 mV to 3 mV, etc., along the x-axis of the energy calibrated histogram 804. The histogram can also be called a spectrum or a gamma ray spectrum. In view of the foregoing description, it will be appreciated that persons of skill in the art would understand the manner for constructing the energy calibrated histogram 804 (and therefore no further details are provided here). The histogram represents a radiation spectrum.

Figure 2B:
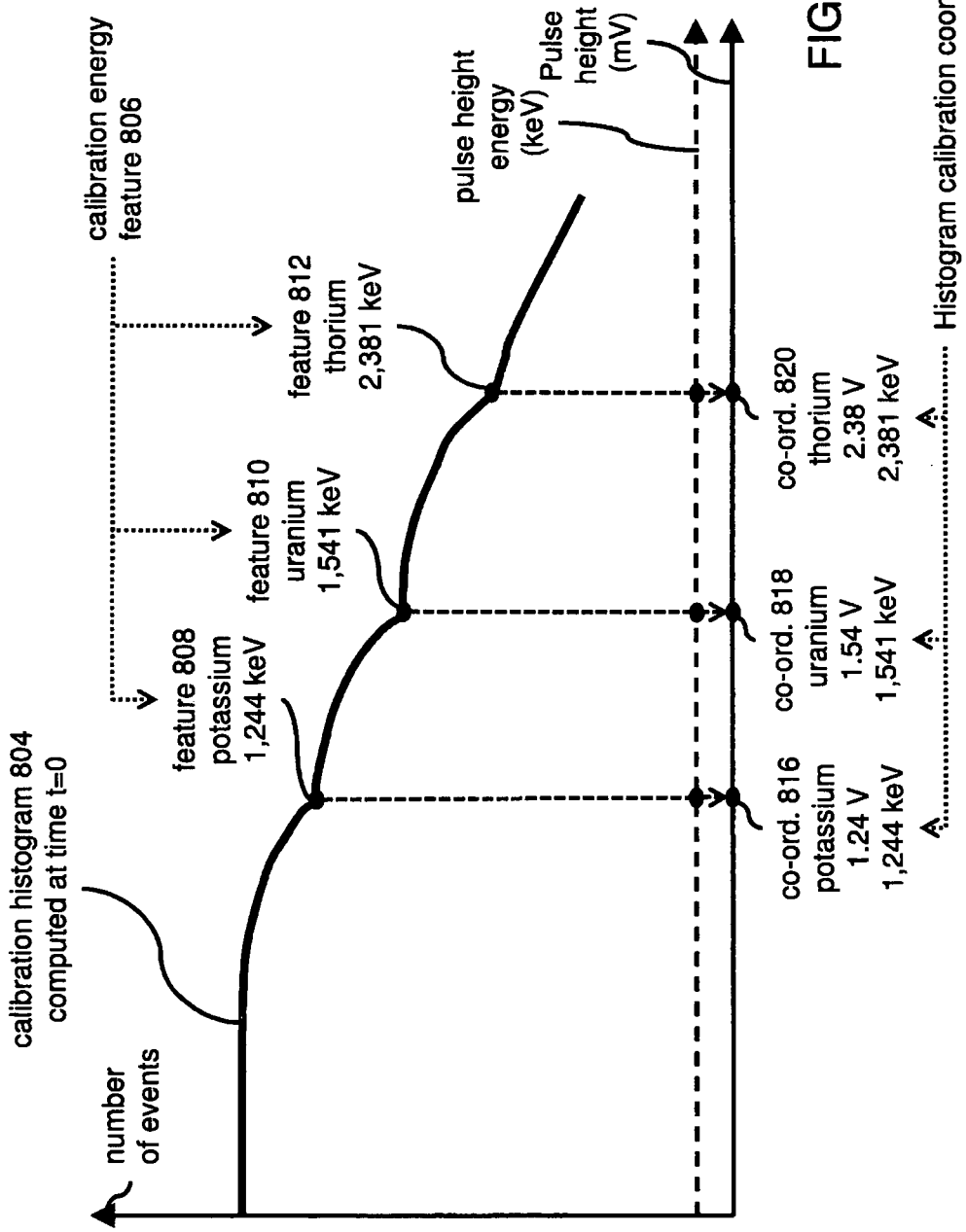
FIG. 2B depicts (SHEET 4 of 10 SHEETS) a schematic representation of an embodiment of an energy calibrated histogram to be computed by the controller assembly of FIG. 1A.

The energy calibrated histogram 804 (depicted in FIG. 2B). The energy calibrated histogram 804 is computed based on the information contained in the detector output signal 706 depicted in FIG. 2A. The source of radiation 900 emits a predetermined quantity of gamma radiation energy, in which the units of measurement for radioactive energy is indicated (for example) in kiloelectron volts or keV (and any equivalent thereof). For instance, when potassium ($^{40}$K) decays, it emits a characteristic 1,461 kiloelectron volt (keV) gamma ray. For instance, when uranium decays through $^{214}$Bi it emits a characteristic 1,764 keV gamma ray. For instance, when Thorium decays through $^{208}$Tl it emits a characteristic gamma ray of 2,614 keV. It will be appreciated that radioactivity from source of radiation 900 is the cause of pulses that appear in the detector output signal 706. It will be appreciated that the energy of the radiation emitted from the source of radiation 900 is a specific energy associated with a specific naturally occurring or man-made radionuclide.

FIG. 2B depicts a schematic representation of an embodiment of the energy calibrated histogram 804 to be captured by the controller assembly 400 of FIG. 1A.

It will be appreciated that more radioactivity of the source of radiation 900 is the cause of more pulses that appear in the detector output signal 706. The energy calibrated histogram 804 is accumulated, and is a way to compute (identify) the number of pulses and the heights of the pulses identified in the detector output signal 706 (depicted in FIG. 2A). The accumulation of the energy, calibrated histogram 804 used for energy calibration is based on the information contained in the detector assembly 300 under the detector output signal 706 (under calibration condition). The x-axis of the energy calibrated histogram 804 represents the pulse height of the detector output signal 706, in millivolts (mV). In addition, the x-axis of the energy calibrated histogram 804 can also represent the pulse height energy of the detector output signal 706, in kiloelectron volts (keV). The y-axis of the energy calibrated histogram 804 represents the number of detection events (the number of pulses that appear in the detector output signal 706).

A detection event (a pulse appearing in the detector output signal 706) represents the occurrence of electron movement from the detector assembly 300 (depicted in FIG. 1A) as a result of the detector input section 302 of the detector assembly 300 sensing an output signal from the scintillation detector 200. The energy calibrated histogram 804 with the radioactive event counts is constructed based on the pulse height for each radioactive event to be found (associated with) the detector output signal 706 of FIG. 2A.

In accordance with an embodiment, the x-axis (pulse height) is segmented into bins aligned along the X-axis. The binning of the x-axis is done as follows: bin number 0 contains the number of pulses (in the detector output signal 706) having a pulse height that exists between for example zero (0) mV to ten (1) mV; bin number 1 contains the number of pulses (in the detector output signal 706) having a pulse height that exists between 1 mV to 2 mV; bin number 2 contains the number of pulses (in the detector output signal 706) having a pulse height between 2 mV to 3 mV, etc., along the x-axis of the energy calibrated histogram 804. In view of the foregoing description, it will be appreciated that persons of skill in the art would understand the manner for constructing the energy calibrated histogram 804 (and therefore no further details are provided here).

In summary, the energy calibrated histogram 804 is derived from information associated with (contained in) the detector output signal 706 (depicted in FIG. 2A).

In connection with FIG. 2B, the controller assembly 400 is configured to execute an operation 514 for computing the energy calibrated histogram 804 based on the information associated with (contained in) the detector output signal 706 (depicted in FIG. 2A). More specifically, the controller assembly 400 is configured to execute an operation 516 for computing the energy calibrated histogram 804 based on the information contained in a predetermined duration of time of the detector output signal 706. It will be appreciated that the predetermined duration of time may be about five minutes, or any suitable duration of time that may be required in order for the energy calibrated histogram 804 to provide the calibration energy feature 806 (with a sufficient degree of confidence satisfactory for the purposes of the person of skill in the art).

Once the energy calibrated histogram 804 is captured, the controller assembly 400 is configured to execute an operation 518 for providing (writing or displaying) the energy calibrated histogram 804 having the calibration energy feature 806 (to be displayed to the trained factory technician in the art by way of a display screen 411 depicted in FIG. 1B). It will be appreciated that the energy calibrated histogram 804 is to be displayed to the trained factory technician or other type of user). The energy calibrated histogram 804 will be stored as well.

Once the energy calibrated histogram 804 is displayed, the person of skill in the art identifies a calibration energy feature 806 to be found in the energy calibrated histogram 804 that is displayed by the display screen 411. It will be appreciated that persons of skill in the art will understand that placement. It will be appreciated that the system depicted in FIG. 1A uses a naturally occurring background radioactive material or cosmic radiation (and may use a calibrated radiation source if so desired or any type of gamma radiation source). The person of skill in the art will understand how to locate and identify the calibration energy feature 806 in the energy calibrated histogram 804 (depending on the type of radioactive substance used. Therefore, no further explanation is provided here for the manner in which the person of skill in the art identifies the calibration energy feature 806 to be found (identified) in the energy calibrated histogram 804. It will be appreciated that the person of skill in the art identifies the calibration energy feature 806 (also called the energy calibration points) at time t=0 (the factory calibration) for the performance of the detector assembly 300 of FIG. 1A.

The controller assembly 400 is configured to execute an operation 520 for inputting (reading or receiving) the calibration energy feature 806 (provided by the person of skill in the art via a user input device 413, such as a keyboard, depicted in FIG. 1B).

The controller assembly 400 is configured to execute an operation 522 for receiving (reading) and for storing (writing) the calibration energy feature 806 to the memory assembly 410 (depicted in FIG. 1B). It is understood that the calibration energy feature 806 represents a distinctive point (to be found in the energy calibrated histogram 804)

For instance, at time t=0, the calibration energy feature 806 includes a potassium energy calibration feature 808, a Uranium energy calibration feature 810, and a Thorium energy calibration feature 812. The Potassium energy calibration feature 808 is associated with a predetermined Potassium energy quantity (such as, 1.24 V (Volts) or 1,244 keV), and is generated because potassium was proximate to the scintillation detector 200 of FIG. 1A. The Uranium energy calibration feature 810 (associated with Uranium) has a predetermined uranium energy quantity (such as, 1.54 V (volts) or 1,541 keV), and is generated because uranium was proximate to the scintillation detector 200 of FIG. 1A. The Thorium energy calibration feature 812 (associated with Thorium) has a predetermined thorium energy quantity (such as, 2.38 V or 2,381 keV), and is generated because Thorium was proximate to the scintillation detector 200 of FIG. 1A.

It is understood that for Thorium ($^{208}$Tl), the primary gamma ray energy equals 2,614 keV, and that this gamma ray deposits a maximum 2,381 keV to the scintillation detector 200 (also called the PVT); this is apparent to those skilled in the art, and the value is about 2.38 V (volts) in the energy calibrated histogram 804. It is understood that for Uranium ($^{214}$Bi), the primary gamma energy equals 1,764 keV, and that this gamma ray deposits a maximum of 1,541 keV to the scintillation detector 200 (also called the PVT); this is apparent to those skilled in the art, and this value is about 1.54 V in the energy calibrated histogram 804. It is understood that for Potassium ($^{40}$K), the primary gamma ray energy equals 1,461 keV, and that this gamma ray deposits a maximum of 1,244 keV to the scintillation detector 200 (also called the PVT); this is apparent to those skilled in the art, and that the value is about 1.24 V in the energy calibrated histogram 804.

The controller assembly 400 is configured to execute an operation 524 for computing (plotting) the energy calibrated histogram 804 based on the detector output signal 706 (depicted in FIG. 2A).

The controller assembly 400 is configured to execute an operation 526 for providing (displaying, writing) the energy calibrated histogram 804 having the calibration energy feature 806. The energy calibrated histogram 804 is to be provided to the person of skill in the art.

The controller assembly 400 is configured to execute an operation 528 for receiving (reading) information that identifies the calibration energy feature 806 (this information is to be provided by the person of skill in the art (or other appropriate user), or may be programmed into the microprocessor-executable code 412 or may be stored in the memory assembly 410, etc.

The controller assembly 400 is configured to execute an operation 530 for identifying a histogram calibration coordinate 814 (positioned on the x-axis) that is associated with the calibration energy feature 806 as identified by the person of skill in the art. The histogram calibration coordinate 814 identifies a pulse height, measured in millivolts (mV), for the calibration energy feature 806 identified in the energy calibrated histogram 804.

The controller assembly 400 is configured to execute an operation 532 for converting the pulse height (measured in mV units) to a pulse height energy (measured in keV units) for the histogram calibration coordinate 814 (with the calibration energy feature 806 contained in the energy calibrated histogram 804).

During calibration at time t=0, the histogram calibration coordinate 814 includes a calibration potassium histogram coordinate 816, a calibration uranium histogram coordinate 818, and a calibration thorium histogram coordinate 820. The calibration potassium histogram coordinate 816 is associated with the potassium energy calibration feature 808. The calibration uranium histogram coordinate 818 is associated with the uranium energy calibration feature 810. The calibration thorium histogram coordinate 820 is associated with the thorium energy calibration feature 812.

For instance, the calibration potassium histogram coordinate 816 has a 1.24 V coordinate (located on the x-axis) that corresponds to the potassium energy calibration feature 808 (associated with the predetermined potassium energy quantity, such as 1,244 keV). The calibration uranium histogram coordinate 818 has a 1.54 V coordinate (located on the x-axis) that corresponds to the uranium energy calibration feature 810 (associated with the predetermined uranium energy quantity, such as 1,541 keV). The calibration thorium histogram coordinate 820 has a 2.38 V coordinate (located on the x-axis) that corresponds to the thorium energy calibration feature 812 (associated with the predetermined thorium energy quantity, such as 2,381 keV).

Figure 2C:
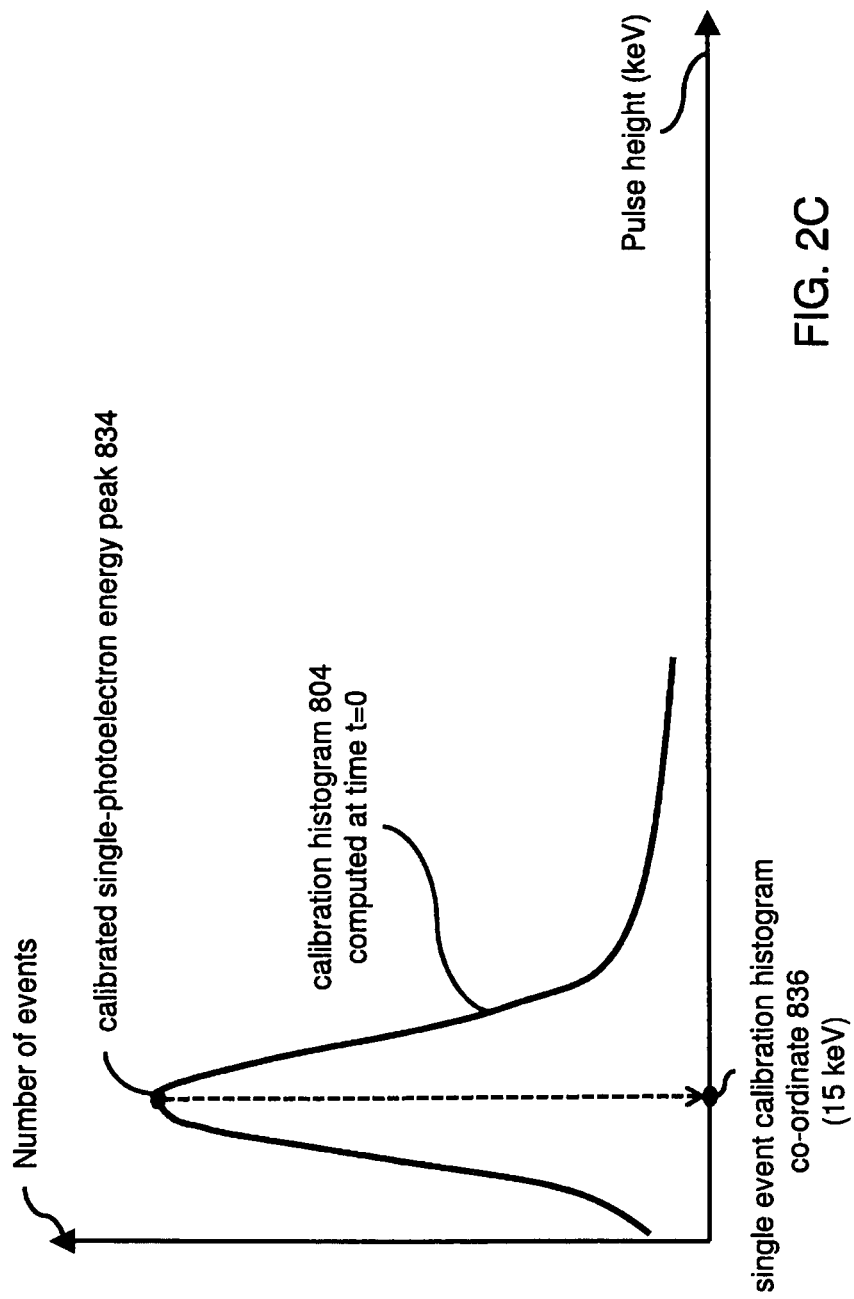
FIG. 2C (SHEET 5 of 10 SHEETS) depicts a schematic representation of an embodiment of single-photoelectron energy peak provided in an energy calibrated histogram to be identified by the controller assembly of FIG. 1A.

FIG. 2C depicts a schematic representation of an embodiment of a calibrated single-photoelectron energy peak 834 provided in the energy calibrated histogram 804 and to be identified by the controller assembly 400 of FIG. 1A.

The controller assembly 400 is configured to execute an operation 534 for identifying the calibrated single-photoelectron energy peak 834 in the energy calibrated histogram 804. The calibrated single-photoelectron energy peak 834 is preferably identified by the controller assembly 400 at the time of factory calibration (initial calibration).

The controller assembly 400 is configured to execute an operation 536 for recording the calibrated single-photoelectron energy peak 834 that was identified in the energy calibrated histogram 804.

The controller assembly 400 is configured to execute an operation 538 for identifying a calibrated single-photoelectron histogram coordinate 836 that is associated with the calibrated single-photoelectron energy peak 834 that was identified in the energy calibrated histogram 804. The calibrated single-photoelectron energy peak 834 is a coordinate found on the x-axis of the energy calibrated histogram 804 (as depicted in FIG. 2C). For instance, the calibrated single-photoelectron histogram coordinate 836 equals about 15 keV at time t=0 (at the time of the factory calibration).

The energy calibrated histogram 804 (as depicted in FIG. 2C) is magnified at the lower end of the x-axis (pulse height), and thus the calibration energy feature 806 of FIG. 2B is not depicted. The location of the calibrated single-photoelectron energy peak 834 is to be found at a lower zone of the energy calibrated histogram 804 and is located at the extreme lower end of the x-axis (pulse height). The location of the calibrated single-photoelectron energy peak 834 is found at the peak of the energy calibrated histogram 804 at the lower end of the x-axis.

For the zone located horizontally to the right (lower energy) of the calibrated single-photoelectron energy peak 834, the detector assembly 300 is blind (that is, the detector assembly 300 provides no detectable output signal); at this gamma ray energy level the detector assembly 300 cannot detect radiation (simply because there is not enough gamma ray energy present to urge a single photoelectron to move). For the zone located horizontally to the left of the calibrated single-photoelectron energy peak 834, the detector assembly 300 is not blind (that is, the detector assembly 300 provides a detectable output signal) simply because there is enough gamma ray energy present to urge a single photoelectron to move (in the detector assembly 300); for this case, there is a magnitude for the calibrated single-photoelectron energy quantity 324. By way of example, the calibrated single-photoelectron energy peak 834 has a calibrated single-photoelectron histogram coordinate 836 equal to 15 keV, at time t=0 (the initial calibration).

FIG. 2D depicts a schematic representation of an embodiment of a subsequent histogram 822 to be computed by the controller assembly 400 of FIG. 1A.

The controller assembly 400 is configured to execute an operation 540 for computing (plotting) the subsequent histogram 822 based on a subsequent detector output (to be provided by the detector assembly 300 of FIG. 1A) for a predetermined duration of time (such as, five minutes) at a time t=1 (such as 100 days after time t=0). It will be appreciated that the time t=1 is a point in time after the factory calibration at time t=0. The predetermined duration of time may be from about three minutes to about six minutes (or whatever suitable time period that may be required as identified by the person of skill in the art). The subsequent detector output is not depicted but somewhat similar in appearance to the detector output signal 706 depicted in FIG. 2A.

The controller assembly 400 is configured to execute an operation 542 for identifying the energy calibration feature 826 to be provided by (found in) the subsequent histogram 822. The subsequent histogram 822 includes, for instance, a potassium energy feature 828, a uranium energy feature 830, and a thorium energy feature 832. Persons of skill in the art would understand that the energy calibration feature 826 is to be found in the subsequent histogram 822 at the same vertical height as the calibration energy feature 806 (and that no further explanation is required here). The subsequent potassium energy feature 828 has a histogram coordinate that does not match up with the calibration potassium histogram coordinate 816 corresponding with the potassium energy calibration feature 808 (associated with the predetermined potassium energy quantity, such as 1,244 keV). The subsequent uranium energy feature 830 has a histogram coordinate that does not match up with the calibration uranium histogram coordinate 818 corresponding with the uranium energy calibration feature 810 (associated with the predetermined uranium energy quantity, such as 1,541 keV). The subsequent thorium energy feature 832 has a histogram coordinate that does not match up with the calibration thorium histogram coordinate 820 corresponding with the thorium energy calibration feature 812 (associated with the predetermined thorium energy quantity, such as 2,381 keV).

The controller assembly 400 is configured to execute an operation 544 for computing the amount of gain to be applied to the detector output section 312 of the detector assembly 300. The amount of gain (either positive magnitude or negative magnitude) to be applied is such that the detector output section 312 changes (increases or decreases, as may be required) so that the subsequent energy calibration feature 826 (such as subsequent potassium energy feature 828, subsequent uranium energy feature 830, and subsequent thorium energy feature 832) line up (or match up) with the calibration energy feature 806 (such as the potassium energy calibration feature 808, the uranium energy calibration feature 810, and the thorium energy calibration feature 812).

The controller assembly 400 is configured to execute an operation for 546 for recording (writing) that change in gain to be applied by the detector output section 312 of the detector assembly 300.

The controller assembly 400 is configured to execute an operation 548 for transmitting (providing) the gain that was computed to the detector assembly 300 in such a way that the detector output section 312 changes in order to match up the subsequent energy calibration feature 826 (such as, the subsequent potassium energy feature 828, the subsequent uranium energy feature 830, and the subsequent thorium energy feature 832) with the calibration energy feature 806 (such as, the potassium energy calibration feature 808, the uranium energy calibration feature 810, and the thorium energy calibration feature 812).

As a result, the controller assembly 400 has adjusted the operation of the detector assembly 300 at time t=1 to correspond with the operation of the detector assembly 300 at time t=0.

The controller assembly 400 is configured to execute an operation 550 for reiterating computation (computational looping) of the gain to be applied to the detector assembly 300. For instance, the reiteration may be performed periodically, such as every 10 minutes, etc. In this way, the gain of the detector assembly 300 is periodically computed and adjusted in such a way as to compensate for the long-term degradation of the operation of the detector assembly 300 (and/or for compensating for the influence of temperature on the operation of the detector assembly 300). For instance, the gain of the detector assembly 300 may be periodically computed and adjusted on the fly, on a periodic basis for each computed instance of the subsequent histogram.

It is expected that operation of the detector assembly 300 may be influenced by short-term changes in temperature of the detector assembly 300. For the case where the temperature of the detector assembly 300 becomes relatively cooler, the subsequent histogram to be computed may shift to the right side of the plot as depicted in FIG. 2D. For this case, the controller assembly 400 may adjust (reduce) the gain of the detector assembly 300 to compensate for temperature drifts (due to cooler operating temperatures) associated with the detector assembly 300.

For the case where the temperature of the detector assembly 300 becomes relatively warmer, the subsequent histogram to be computed may shift to the left side of the plot as depicted in FIG. 2D. For this case, the controller assembly 400 is configured to execute an operation 552 for adjusting (increasing or decreasing) the gain of the detector assembly 300 to compensate for temperature drifts (due to warmer operating temperatures) associated with the detector assembly 300.

It is understood, in general terms for the short term, that the controller assembly 400 is configured to execute an operation 554 for compensating variation in operating temperature of the detector assembly 300 by adjusting (increase or decrease) the gain of the detector assembly 300 (thereby accounting for temperature variation between subsequently computed histograms).

For the long term, the controller assembly 400 is configured to execute an operation 556 for adjusting (increasing or decreasing) the gain of the detector assembly 300 to compensate for the long term operational degradation of the detector assembly 300.

As time increases over the long term, subsequent histograms are expected to shift to the left side of the plot as depicted in FIG. 2D.

Figure 2E:
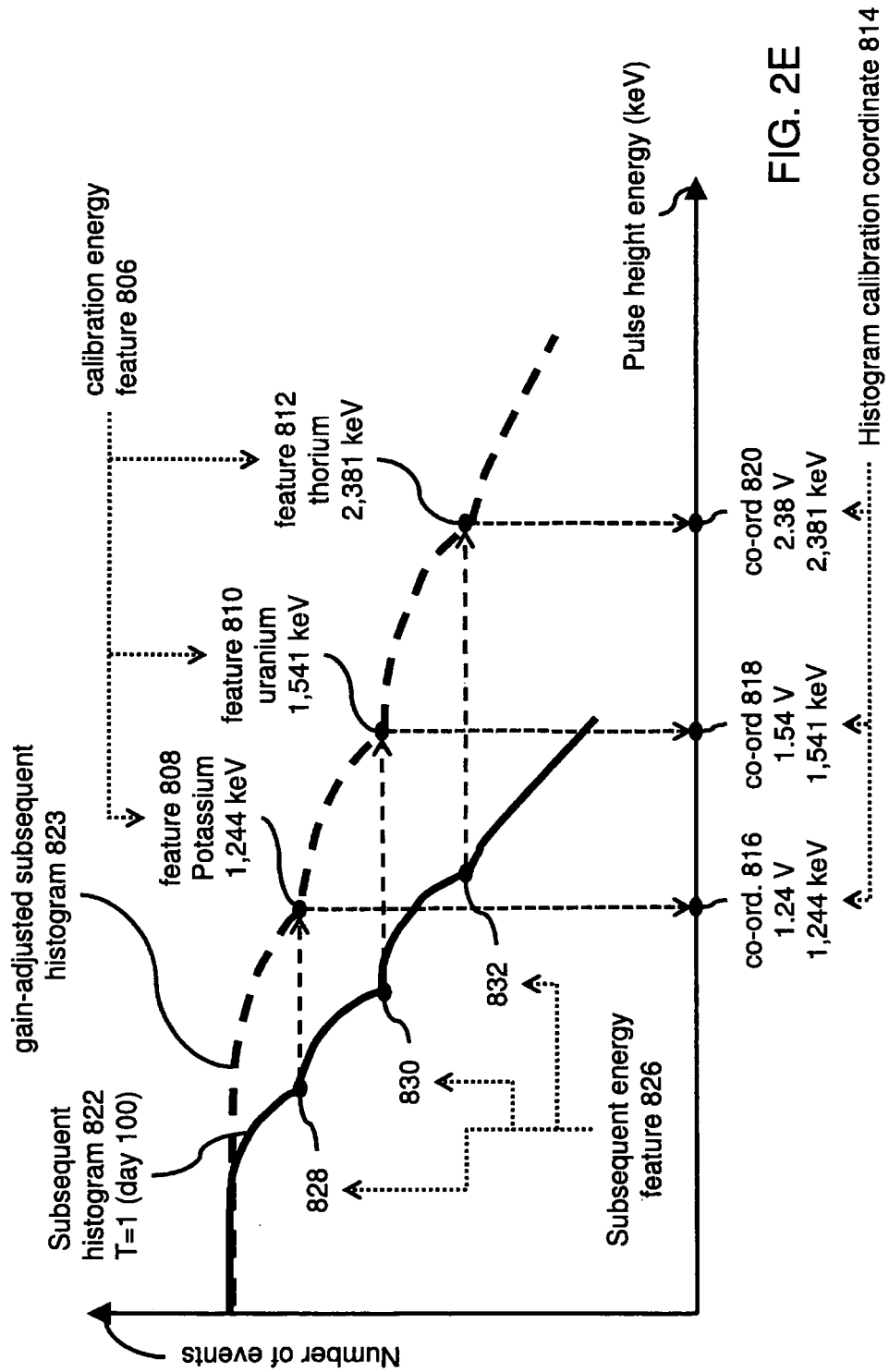
FIG. 2E (SHEET 7 of 10 SHEETS) depicts an embodiment of a gain-adjusted subsequent histogram to be captured by the controller assembly of FIG. 1A.

FIG. 2E depicts an embodiment of a gain-adjusted subsequent histogram 823 to be computed by the controller assembly 400 for a subsequent detector output signal of the detector assembly 300 of FIG. 1A.

It will be appreciated that over time, the single-photoelectron energy peak for each gain-adjusted subsequent histogram that is computed after time t=0 (initial calibration) will change simply because of the degradation of the detector assembly 300 (during the passage of time from time t=0). An example of the single-photoelectron energy peak is depicted in FIG. 2C for the energy calibrated histogram 804 that was computed at time t=0. To track the performance degradation of the detector assembly 300 over time, the controller assembly 400 is configured to execute an operation 558 for tracking (recording, writing) the change computed for the single-photoelectron energy peak for selected instances of the gain-adjusted subsequent histogram that is computed after time t=0 (after initial calibration).

In accordance with an example, the gain adjustment and thus the energy calibration may be performed continuously, typically every 2 minutes (or other suitable time duration). The controller assembly 400 accumulates the gain-adjusted subsequent histogram 823 by applying the gain that was computed from the previous subsequent histogram 822 for time t=1. The gain-adjusted subsequent histogram 823 is adjusted in such a way that the subsequent energy calibration feature 826 of the subsequent histogram 822 (computed at time t=1 and depicted in FIG. 2D) is matched up with the calibration energy feature 806 associated with the energy calibrated histogram 804 computed at time t=0 (depicted in FIG. 2B).

Once the controller assembly 400 has computed the gain-adjusted subsequent histogram 823, the controller assembly 400 is configured to execute an operation 562 for identifying the single-photoelectron energy peak for the energy calibrated histogram 823

Figure 2F:
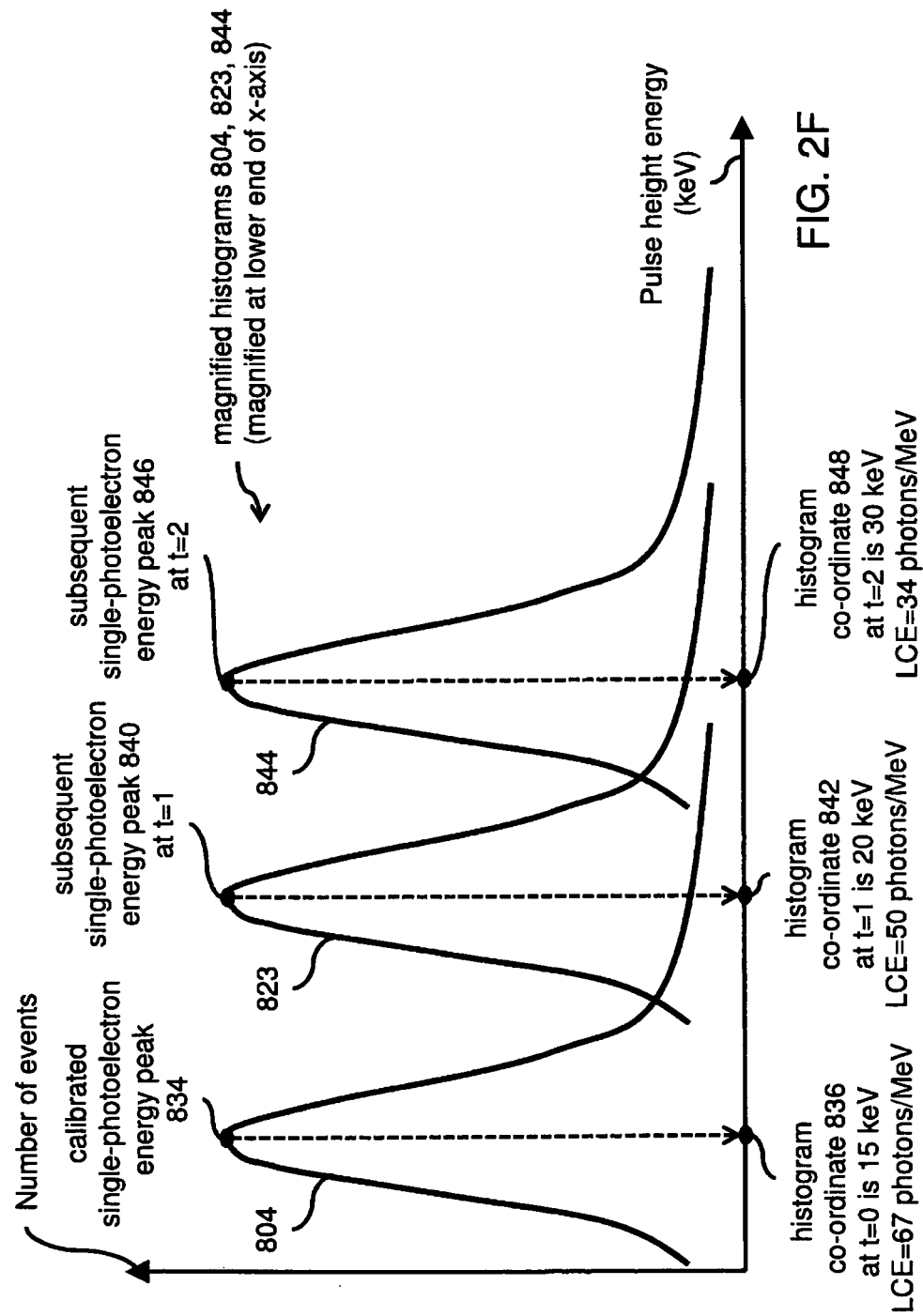
FIG. 2F (SHEET 8 of 10 SHEETS) depicts embodiments of a subsequent single-photoelectron energy peak for an energy calibrated histogram captured by the controller assembly of FIG. 1A.

It will be appreciated that FIG. 2F depicts the single-photoelectron energy peak identified for the energy calibrated histogram 823.

FIG. 2F depicts embodiments of a subsequent single-photoelectron energy peak 840 for an energy calibrated histogram 823 to be computed by the controller assembly 400 for the detector assembly 300 of FIG. 1A.

The controller assembly 400 is configured to execute an operation 564 for identifying the subsequent single-photoelectron energy peak 840 for the energy calibrated histogram 823 that was computed (in association with FIG. 2E). It will be appreciated that the subsequent single-photoelectron energy peak 840 is to be found (located, identified) at the lower end (low energy) of the x-axis of the gain-adjusted subsequent histogram 823.

The controller assembly 400 is configured to execute an operation 568 for identifying the histogram coordinate (x-axis co-ordinate) for the subsequent single-photoelectron energy peak 840 that was identified.

The controller assembly 400 is configured to execute an operation 570 for recording (to the memory assembly 410 of FIG. 1B) the histogram coordinate for the subsequent single-photoelectron energy peak 840 that was identified.

For instance, at time t=2 (such as, at 200 days, or other, such as continuously as may be required) after initial performance assessment or other suitable duration of time), the controller assembly 400 is configured to execute an operation 572 for computing (and recording the histogram coordinate 848 for the subsequent single-photoelectron energy peak 846 that was identified in association with the subsequent histogram 844 computed at time t=2 (such as 200 days after time t=0). It will be appreciated that the above is simply an example description, and that if desired, the controller assembly 400 may be configured to execute the calibration as often as desired, such as every few minutes or so. The graph is shows samples after 100 days or 200 days simply for explanatory purposes only. It will be appreciated that the computation is performed every two minutes or so (as may be required).

In this manner, the subsequent histogram coordinates for the subsequent single-photoelectron energy peaks are computed and recorded (by the controller assembly 400) to the memory assembly 410 of FIG. 1B. every 5 minutes or suitable time interval The controller assembly 400 is configured to execute an operation for 574 computing the light collection efficiency (LCE) of the detector assembly 300 for the subsequent single-photoelectron energy peak 840 that was identified in association with the subsequent histogram 844 that was computed at time t=1

Preferably, the controller assembly 400 is configured to execute an operation 576 for computing the light collection efficiency by using the following formula:

[1/histogram coordinate in keV]*[1,000 keV/1 MeV]= number of single photoelectrons released per MeV of primary absorbed gamma ray energy.

The controller assembly 400 is configured to execute an operation 578 for comparing the light collection efficiency that was computed against a threshold level 512.

The controller assembly 400 is configured to execute an operation 580 for determining whether the light collection efficiency that was computed is less than or equal to the threshold level 512. For the case where the controller assembly 400 makes a determination that the light collection efficiency that was computed is greater than or equal to the threshold level 512, then the controller assembly 400 reiterates operations (continues computing additional instances of subsequent histograms for threshold analysis or evaluation, on a suitable periodic basis). For the case where the controller assembly 400 makes a determination that the light collection efficiency that was computed is less than the threshold level 512, then the controller assembly 400 is configured to execute an operation 582 for issuing a warning indication. The warning indication indicates that the detector assembly 300 should be replaced or refurbished since the operation of the detector assembly 300 has degraded below acceptable tolerance.

Of course, it will be appreciated that even if the threshold level 512 has been exceeded, the controller assembly 400 is configured to execute an operation 584 for continuing to reiterate monitoring operations (continues computing additional instances of subsequent histograms for threshold analysis or evaluation, on a suitable periodic basis).

It will be appreciated that as an alternative to having the controller assembly 400 configured to execute an operation for computing the light collection efficiency, the controller assembly 400 is configured to execute an operation 586 for comparing the histogram coordinate 842 against a suitably identified threshold level (having the same units of measurement), if so desired.

In summary, FIGS. 2A, 2B, 2C and 2D are directed to the controller assembly 400 configured to execute an operation 588 for computing (executing a first process for computing) an energy calibration, and a gain adjustment to be applied to the controller assembly 400 of FIG. 1A. The operation 588 is depicted in FIG. 1B (and is tangibly stored as executable code in the memory assembly 410). It will be appreciated that the first process may be performed by the controller assembly 400 on a continuous basis (at selected time intervals as time passes by).

Specifically, the controller assembly 400 is configured to execute the operation 588 for: (A) establishing an energy calibration using the features in a spectrum (also called the histogram, as depicted in FIGS. 2B and 2D and 2E) associated with a radioactive material; and (B adjusting a gain to be applied by the detector assembly 300 based on the known energy features and thus maintain the energy calibration. With a known energy calibration, the equivalent energy of the single photoelectron peak is inversely related to the light collection efficiency and the detector sensitivity.

Preferably, the first process includes: (A) establishing an energy calibration using the features in the spectrum from for example (potassium K, uranium U, and thorium Th); and (B) (continuously) adjusting the gain to maintain a constant calibration (that is, the features are at the same x-coordinate of the histograms).

In summary, FIGS. 2E and 2F are directed to the controller assembly 400 configured to execute an operation 590 for identifying (executing a second process for identifying) the equivalent energy for the single photoelectron events for subsequently received detector output signals provided by the detector assembly 300. The operation 590 is depicted in FIG. 1B (and is tangibly stored as executable code in the memory assembly 410). It will be appreciated that the second process may be performed by the controller assembly 400 on a continuous basis (at selected time intervals as time passes by).

Preferably, the second process includes: (A) observing the location (x-axis) of the single photoelectron peak over time; (B) determining whether the conversion from gamma ray energy to light collection is getting less efficient by detecting whether the single photoelectron peak moves to the right, in which case the detector assembly 300 requires more primary gamma ray energy to release a single photoelectron (and consequently, the conversion from gamma ray energy to light collection is getting less efficient); and (C) measuring the light collection efficiency (LCE) based on the single photoelectron peak as the inverse of the x-coordinate (photoelectrons per kilo volt-electron or keV) since a higher number represents a higher efficiency.

Specifically, the controller assembly 400 is configured to execute the operation 590 for: (A) observing a location of the single photoelectron peak over time in the spectrum; (B) determining whether the conversion from gamma ray energy to light collection is becoming less efficient by detecting whether the single photoelectron peak shifts, in which case the detector assembly 300 requires more primary gamma ray energy to release a single photoelectron and consequently the conversion from gamma ray energy to light collection is getting less efficient; and (C) measuring the light collection efficiency.

It will be appreciated that the first process (operation 588) may be performed (by the controller assembly 400) independently of the second process (operation 590). FIG. 4 depicts the operation 588 and the operation 590 as separate main operations (apart from the operation 502 to operation 586) to be executed by the controller assembly 400 depicted in FIG. 1A and FIG. 1B.

FIG. 3 depicts a schematic view (representation) of an embodiment of the light collection efficiency of the detector assembly 300 of FIG. 1A.

The graph 600 depicted in of FIG. 3 represents detector ability (such as, light collection) as a function of scintillator absolute efficiency. The horizontal axis 606 represents the detector efficiency to a calibrated source in units of counts per second/micro Currie (cps/uCi) for an isotope (such as, Americium-241 known as $^{241}$Am).

The vertical axis 608 represents the light collection efficiency of the detector assembly 300 of FIG. 1A. The vertical axis 608 provides the LCE number. The graph 600 demonstrates that the LCE number is proportional to the absolute detector efficiency.

FIG. 4 depicts a schematic representation of an embodiment of a flow chart 500 depicting operations of the controller assembly 400 depicted in FIG. 1A. The above description provides the details of the operations of the flow chart 500.

In view of the foregoing explanation, the following explanation is provided (as an embodiment) to further clarify the concept. There are ten steps that may be performed By convention, we decide to establish an energy calibration of 1 keV equals 1 mV. We could choose any number.

By decay or from nuclear processes (cosmic) nature has blessed us with some natural gamma rays with specific energies depending on the decaying radionclide or the nuclear process. These are fundamental constants so these are not needed to "calibrate" them. Examples are $^{40}$K, $^{214}$Bi (from uranium decay) and $^{208}$Tl from Thorium decay These gamma rays deposits energy in the PVT scintillation detector, and show up as "features" in the gamma spectrum (also called the histogram) at well-defined apparent energies. (Not all energy is deposited and this is well understood by experts).

Since we know the location of these features, we can adjust the gain of the scintillation detector to so these features are matched up with the correct pulse height. For example the Thorium feature is located at 2,381 keV and with an energy calibration of 1 keV=1 mV the pulse height of the features is supposed to be 2.38V (2,381 mV)

Step 4 is performed continuously and typically every two to five minutes. This ensures a correct energy calibration (i.e., the x-axis is now equivalent to an energy axis.

The single photoelectron peak (SPEP) location is observed by creating a histogram integrating pulses for a few minutes.

The light collection efficiency (LCE) is derived from SPEP. If the SPEP for example is at the x-coordinate 15 keV per single photoelectron (SPE), compute [1,000 keV/1 MeV]/15 keV=66.67 SPE per MeV of deposited energy. Higher number of the LCE means a more efficient conversion from gamma energy to collected photoelectrons.

The LCE evaluation is performed continuously every 2 to 5 minutes.

Based on the linear relationship between the LCE and the absolute detector efficiency it is possible to deduct the LCE minimum threshold if the absolute detector efficiency has been defined (the definition of the lower acceptable absolute detector efficiency is typically a customer requirements and may vary).

If the LCE drops below the LCE minimum threshold then the operator will be warned.

Controller Assembly 400

According to one option, the controller assembly 400 (depicted in FIGS. 1A and 1B) includes controller-executable instructions configured to operate the controller assembly 400 in accordance with the description provided above. The controller assembly 400 may use computer software, or just software, which is a collection of computer programs (controller-executable instructions) and related data that provide the instructions for instructing the controller assembly 400 what to do and how to do it. In other words, software is a conceptual entity that is a set of computer programs, procedures, and associated documentation concerned with the operation of a controller assembly (also called a data-processing system). Software refers to one or more computer programs and data held in a storage assembly (a memory module) of the controller assembly for some purposes. In other words, software is a set of programs, procedures, algorithms and its documentation. Program software performs the function of the program it implements, either by directly providing instructions to computer hardware or by serving as input to another piece of software. In computing, an executable file (executable instructions) causes the controller assembly 400 to perform indicated tasks according to encoded instructions, as opposed to a data file that must be parsed by a program to be meaningful. These instructions are machine-code instructions for a physical central processing unit. However, in a more general sense, a file containing instructions (such as, bytecode) for a software interpreter may also be considered executable; even a scripting language source file may therefore be considered executable in this sense. While an executable file can be hand-coded in machine language, it is far more usual to develop software as source code in a high-level language understood by humans, or in some cases, an assembly language more complex for humans but more closely associated with machine code instructions. The high-level language is compiled into either an executable machine code file or a non-executable machine-code object file; the equivalent process on assembly language source code is called assembly. Several object files are linked to create the executable. The same source code can be compiled to run under different operating systems, usually with minor operating-system-dependent features inserted in the source code to modify compilation according to the target. Conversion of existing source code for a different platform is called porting. Assembly-language source code and executable programs are not transportable in this way. An executable comprises machine code for a particular processor or family of processors. Machine-code instructions for different processors are completely different and executables are totally incompatible. Some dependence on the particular hardware, such as a particular graphics card may be coded into the executable. It is usual as far as possible to remove such dependencies from executable programs designed to run on a variety of different hardware, instead installing hardware-dependent device drivers on the controller assembly 400, which the program interacts with in a standardized way. Some operating systems designate executable files by filename extension (such as ".exe") or noted alongside the file in its metadata (such as, by marking an execute permission in Unix-like operating systems). Most also check that the file has a valid executable file format to safeguard against random bit sequences inadvertently being run as instructions. Modern operating systems retain control over the resources of the controller assembly 400, requiring that individual programs make system calls to access privileged resources. Since each operating system family features its own system call architecture, executable files are generally tied to specific operating systems, or families of operating systems. There are many tools available that make executable files made for one operating system work on another one by implementing a similar or compatible application binary interface. When the binary interface of the hardware the executable was compiled for differs from the binary interface on which the executable is run, the program that does this translation is called an emulator. Different files that can execute but do not necessarily conform to a specific hardware binary interface, or instruction set, can be represented either in bytecode for Just-in-time compilation, or in source code for use in a scripting language.

According to another option, the controller assembly 400 includes application-specific integrated circuits configured to operate the controller assembly 400 in accordance with the description provided above. It may be appreciated that an alternative to using software (controller-executable instructions) in the controller assembly 400 is to use an application-specific integrated circuit (ASIC), which is an integrated circuit (IC) customized for a particular use, rather than intended for general-purpose use. For example, a chip designed solely to run a cell phone is an ASIC. Some ASICs include entire 32-bit processors, memory blocks including ROM, RAM, EEPROM, Flash and other large building blocks. Such an ASIC is often termed a SoC (system-on-chip). Designers of digital ASICs use a hardware description language (HDL) to describe the functionality of ASICs. Field-programmable gate arrays (FPGA) are used for building a breadboard or prototype from standard parts; programmable logic blocks and programmable interconnects allow the same FPGA to be used in many different applications. For smaller designs and/or lower production volumes, FPGAs may be more cost effective than an ASIC design. A field-programmable gate array (FPGA) is an integrated circuit designed to be configured by the customer or designer after manufacturing—hence field-programmable. The FPGA configuration is generally specified using a hardware description language (HDL), similar to that used for an application-specific integrated circuit (ASIC) (circuit diagrams were previously used to specify the configuration, as they were for ASICs, but this is increasingly rare). FPGAs can be used to implement any logical function that an ASIC could perform. The ability to update the functionality after shipping, partial re-configuration of the portion of the design and the low non-recurring engineering costs relative to an ASIC design offer advantages for many applications. FPGAs contain programmable logic components called logic blocks, and a hierarchy of reconfigurable interconnects that allow the blocks to be wired together—somewhat like many (changeable) logic gates that can be inter-wired in (many) different configurations. Logic blocks can be configured to perform complex combinational functions, or merely simple logic gates like AND and XOR. In most FPGAs, the logic blocks also include memory elements, which may be simple flip-flops or more complete blocks of memory. In addition to digital functions, some FPGAs have analog features. The most common analog feature is programmable slew rate and drive strength on each output pin, allowing the engineer to set slow rates on lightly loaded pins that would otherwise ring unacceptably, and to set stronger, faster rates on heavily loaded pins on high-speed channels that would otherwise run too slow. Another relatively common analog feature is differential comparators on input pins designed to be connected to differential signaling channels.

A few "mixed signal FPGAs" have integrated peripheral Analog-to-Digital Converters (ADCs) and Digital-to-Analog Converters (DACs) with analog signal conditioning blocks allowing them to operate as a system-on-a-chip. Such devices blur the line between an FPGA, which carries digital ones and zeros on its internal programmable interconnect fabric, and field-programmable analog array (FPAA), which carries analog values on its internal programmable interconnect fabric.

This written description uses examples to disclose the invention, including the best mode, and also to enable any person skilled in the art to make and use the invention. The patentable scope of the invention is defined by the claims, and may include other examples that occur to those skilled in the art. Such other examples are within the scope of the claims if they have structural elements that do not differ from the literal language of the claims, or if they include equivalent structural elements with insubstantial differences from the literal language of the claims.

It may be appreciated that the assemblies and modules described above may be connected with each other as required to perform desired functions and tasks within the scope of persons of skill in the art to make such combinations and permutations without having to describe each and every one in explicit terms. There is no particular assembly, or component that may be superior to any of the equivalents available to the person skilled in art. There is no particular mode of practicing the disclosed subject matter that is superior to others, so long as the functions may be performed. It is believed that all the crucial aspects of the disclosed subject matter have been provided in this document. It is understood that the scope of the present invention is limited to the scope provided by the independent claim(s), and it is also understood that the scope of the present invention is not limited to: (i) the dependent claims, (ii) the detailed description of the non-limiting embodiments, (iii) the summary, (iv) the abstract, and/or (v) the description provided outside of this document (that is, outside of the instant application as filed, as prosecuted, and/or as granted). It is understood, for this document, that the phrase "includes" is equivalent to the word "comprising." The foregoing has outlined the non-limiting embodiments (examples). The description is made for particular non-limiting embodiments (examples). It is understood that the non-limiting embodiments are merely illustrative as examples.

What is claimed is:

1. An apparatus comprising:
   a radiation detector, the radiation detector configured to:
      detect radiation energy; and
      output, in response to the radiation energy, a signal; and
   a controller assembly computing device, the controller assembly computing device configured to:
      receive, from the radiation detector, the signal;
      determine, based on the signal, one or more subsequent energy features;
      calculate, based on the one or more subsequent energy features and one or more known energy features, a gain;
      determine, based on the signal, a subsequent single photoelectron energy peak; and
      determine, based on the subsequent single photoelectron energy peak and a threshold, a performance metric for the apparatus.

2. The apparatus of claim 1, wherein the gain is applied to the signal to compensate for a shift in the signal which causes the one or more known energy features to be perceived as the one or more subsequent energy features.

3. The apparatus of claim 1, wherein the radiation detector includes a scintillation detector and a light sensing device, wherein
   the scintillation detector is configured to:
      detect the radiation energy; and
      emit, in response to the radiation energy, a light pulse, wherein a feature of the light pulse is proportional to the radiation energy;
   the light sensing device is configured to:
      receive, from the scintillation detector, the light pulse; and
      produce, based on the light pulse, an electrical charge;
   wherein the signal comprises the electrical charge.

4. The apparatus of claim 3, wherein the feature of the light pulse is an amount of light comprising the light pulse.

5. The apparatus of claim 1, wherein the performance metric for the apparatus is an efficiency of light collection, and wherein the controller assembly computing device, in determining the performance metric for the apparatus, is further configured to:
   determine, based on the subsequent single photoelectron energy peak, a subsequent light collection efficiency of the apparatus; and
   compare the subsequent light collection efficiency to the threshold.

6. The apparatus of claim 5, wherein the controller assembly computing device is further configured to:
   determine that the subsequent light collection efficiency is below the threshold; and
   cause a warning to be issued, wherein the warning indicates that the subsequent light collection efficiency is below the threshold.

7. The apparatus of claim 6, wherein the subsequent light collection efficiency being below the threshold is indicative of degradation of the radiation detector.

8. The apparatus of claim 5, wherein the threshold is a calibrated light collection efficiency, and wherein the calibrated light collection efficiency is based, at least in part, on a calibrated single photoelectron peak.

9. The apparatus of claim 1, wherein the one or more known energy features and the threshold are based on a calibrated energy spectrum.

10. The apparatus of claim 9, wherein the calibrated energy spectrum is based on known background radiation energies.

11. A method for determining a performance metric for a radiation detector, the method comprising:
   receiving, at a controller assembly from the radiation detector, a signal;
   determining, at the controller assembly based on the signal, one or more subsequent energy features;
   calculating, at the controller assembly based on the one or more subsequent energy features and one or more known energy features, a gain;
   determining, at the controller assembly based on the signal, a subsequent single photoelectron peak; and
   determining, at the controller assembly based on the subsequent single photoelectron peak and a threshold, the performance metric for the radiation detector.

12. The method of claim 11, wherein the gain is applied to the signal to compensate for a shift in the signal which causes the one or more known energy features to be perceived as the one or more subsequent energy features.

13. The method of claim 11, wherein the radiation detector includes a scintillation detector and a light sensing device, wherein the light sensing devices receives a light pulse from the scintillation detector, wherein the light sensing device produces an electrical charge based on the light pulse, and wherein the signal comprises the electrical charge.

14. The method of claim 11, wherein a quantity associated with the light pulse is proportional to radiation energy detected by the radiation detector, and wherein the signal is proportional to the quantity associated with the light pulse.

15. The method of claim 11, wherein the performance metric for the radiation detector is an efficiency of light collection, the method further comprising:
   determining, based on the subsequent single photoelectron peak, a subsequent light collection efficiency of the radiation detector, and
   comparing the subsequent light collection efficiency to the threshold.

16. The method of claim 15, further comprising:
   determining that the subsequent light collection efficiency is below the threshold; and
   causing a warning to be issued, the warning indicating that the subsequent light collection efficiency is below the threshold.

17. The method of claim 16, wherein the subsequent light collection efficiency being below the threshold is indicative of degradation of the radiation detector.

18. The method of claim 15, wherein the threshold is a calibrated light collection efficiency, and wherein the calibrated light collection efficiency is based, at least in part, on a calibrated single photoelectron peak.

19. The method of claim 11, wherein the one or more known energy features and the threshold are based on a calibrated energy spectrum.

20. The method of claim 19, wherein the calibrated energy spectrum is based on known background radiation energies.

* * * * *